US007447312B2

(12) United States Patent
Javidi et al.

(10) Patent No.: US 7,447,312 B2
(45) Date of Patent: Nov. 4, 2008

(54) METHOD AND APPARATUS FOR SECURE ULTRAFAST COMMUNICATION

(75) Inventors: Bahram Javidi, Storrs, CT (US); Osamu Matoba, Chiba (JP)

(73) Assignee: University of Connecticut, Storrs, CT (US)

( * ) Notice: Subject to any disclaimer, the term of this patent is extended or adjusted under 35 U.S.C. 154(b) by 725 days.

(21) Appl. No.: 09/993,894

(22) Filed: Nov. 23, 2001

(65) Prior Publication Data

US 2002/0150242 A1 Oct. 17, 2002

Related U.S. Application Data

(60) Provisional application No. 60/253,288, filed on Nov. 27, 2000.

(51) Int. Cl.
*G09C 5/00* (2006.01)
(52) U.S. Cl. ............................. 380/54; 380/256; 359/1
(58) Field of Classification Search .................. 380/54, 380/256; 359/1
See application file for complete search history.

(56) References Cited

U.S. PATENT DOCUMENTS 5,793,871 A * 8/1998 Jackson ......................... 380/54
5,903,648 A * 5/1999 Javidi ........................... 380/54
6,577,782 B1 * 6/2003 Leaird et al. ................. 385/15

OTHER PUBLICATIONS

Ding et al, "Femtosecond Pulse Shaping by Dynamic Holograms in Photorefractive Multiple Quantum Wells", Optics Letters, vol. 22, No. 10, May 15, 1997, pp. 718-720.*
Leaird et al, "Chirp Control in the Direct Space-to-Time Pulse Shaper", Optics Letters, vol. 25, No. 11, Jun. 1, 2000, pp. 850-852.*
Leaird et al, "Femtosecond Optical Packet Generation by a Direct Space-to-Time Pulse Shaper", Optics Letters, vol. 24, No. 12, Jun. 15, 1999, pp. 853-855.*
Matoba et al, "Encrypted Optical Storage with Angular Multiplexing", Applied Optics, vol. 38, No. 35, Dec. 10, 1999, pp. 7288-7293.*
Matoba et al, "Encrypted Optical Storage with Wavelength-Key And Random Phase Codes", Applied Optics, vol. 38, No. 32, Nov. 10, 1999, pp. 6785-6790.*
Sun et al, "Space-Time Processing with Photorefractive Volume Holography", Proceedings of the IEEE, vol. 87, No. 12, Dec. 1999, pp. 2086-2097.*
Calver et al., Experimental Optical Fibre Digital Pulse-Position Modulation System, IEEE, Jan. 88, Retrieved from the Internet on Oct. 19, 2006: <URL: http://ieeexplore.ieee.org/iel1/2220/280/00005554.pdf?tp=&arnumber=5554&isnumber=280>.*
O. Matoba and B. Javidi, Secure Ultrafast Communication With Spatial-Temporal Converters, Applied Optics, vol. 39, No. 17, 2975-2981 (Jun. 10, 2000).
H.-Y., Li, Y. Qiao, and D. Psaltis, "Optical neural network for real-time face recognition," Appl. Opt. 32, 5026-5035 (1993).

(Continued)

*Primary Examiner*—Gilberto Barron, Jr.
*Assistant Examiner*—Minh Dinh
(74) *Attorney, Agent, or Firm*—Cantor Colburn LLP

(57) ABSTRACT

The present invention describes an ultrafast secure data communication system that can link remote users to an encrypted database with holographic-stored data and a high security and ultrafast transfer rate.

21 Claims, 8 Drawing Sheets

OTHER PUBLICATIONS

C. L. Wilson, C. I. Wilson and E.G. Peak, "Combined optical neural network fingerprint matching," in Optical Pattern Recognition VIII, D.P. Casasent and T. Chao, eds. Proc. SPIE 3073, 373-382 (1997).

B. Javidi and J. L. Horner, "Optical pattern recognition for validation and security verification," Opt. Eng. 33, 1752-1756 (1994).

P. Réfrégier and B. Javidi, "Optical image encryption based on input plane and Fourier plane random encoding," Opt. Lett. 20, 767-769 (1995).

H. F. Heanue, M.C. Bashaw, and L. Hesselink, "Encrypted holographic data Storage Based on Orthogonal-phase-code multiplexing," Appl. Opt. 34, 6012-6015 (1995).

F. Goudail, F. Bollaro, B. Javidi, and P. Réfrégier, "Influence of a perturbation in a double phase-encoding system," J. Opt. Soc. Am. A 15, 2629-2638 (1998).

N. Yoshikawa, M. Itoh, and T. Yatagai, "Binary computer-generated holograms for Security Applications from a Synthetic Double-exposure method by electron-beam lithography," Opt. Lett. 23, 1483-1485 (1998).

O. Matoba and B. Javidi, "Encrypted optical memory system using three-dimensional keys in the Fresnel comain," Opt. Lett. 24, 762-764 (1999).

G. Unnikrishnan, J. Joseph, and K. Singh, "Optical encryption system that uses phase conjugation in a photorefractive crystal," Appl. Opt. 37, 8181-8186 (1998).

Y.T. Mazurenko, "Holography of wave packets," Appl. Phys. B 50, 101-114 (1990).

A.M. Weiner, D.E. Leaired, D.H. Reitze, and E.G. Peak, "Femtosecond Spectral Holograph," IEEE J. Quantum Electron. 28, 2251-2261 (1992).

A.W. Weiner, J.P. Heritage, and J.A. Salehi, "Encoding and Decoding of Femtosecond Pulses," Opt. Lett. 13, 300-302 (1988).

M.C. Nuss, M. Li, T.H. Chiu, A.M. Weiner, and A. Partori, "Time-to-Space mapping of femtosecond pulses," Opt. Lett. 19, 664-666 (1994).

P.C. Sun, Y.T. Mazurenko, W.S.C. Chang, P.K.L. Yu, and Y. Fainman, "All-optical Parallel-to-Serial Conversion by holographic spatical-to-temporal frequency encoding," Opt. Lett. 20, 1728-1730 (1995).

D.M. Marom, P-C. Sun, and Y. Fainman, "Analysis of spatial-temporal converters for all optical communication links," Appl. Opt. 37, 2858-2868 (1998).

D.M. Marom, D. Panasenko, P. C. Sun, and Y Fainman, "Spatical temporal wave mixing for space-time conversion," Opt. Lett. 24, 563-565 (1999).

T. Konishi and Y. Ichioka, "Ultrafast image transmission by optical time-to-two-dimensional-space-to-time-two-dimensional-space conversion," J. Opt. Soc. Am. A 16, 1076-1088 (1999).

* cited by examiner (a)

(b)

(a)

(b)

METHOD AND APPARATUS FOR SECURE ULTRAFAST COMMUNICATION

RELATED APPLICATION

Priority is claimed from U.S. Provisional Patent Application No. 60/1253,288, filed Nov. 27, 2000, and said U.S. Provisional Patent Application is incorporated herein by reference.

BACKGROUND OF THE INVENTION

Optical techniques have previously been suggested for information security [see, for example, Appl. Opt. 32:5026 (1993); Opt. Eng. 33:1752 (1994); Opt. Lett. 20:767 (1995); and Opt. Lett. 23:1483 (1998)]. Encrypted holographic memory systems have previously been demonstrated for retrieving information for authorized users [see Opt. Lett. 24:762 (1999)]. In these systems two random phase masks located at the input and Fourier planes convert an original image into a random-noise-like image. A correct random phase key is required for successful retrieval of the original data. This encrypted holographic memory potentially has a large storage capacity with a fast access; thus it can be used as an encrypted database.

Pulse shapers based on Fourier synthesis in the temporal frequency domain have previously been thoroughly investigated [see, for example, Appl. Phys. B 50:101 (1990); IEEE J. Quantum Electron 28:2251 (1992); Opt. Lett. 19:664 (1994); Appl. Opt. 37:2858 (1998); and J. Opt. Soc. Am. A 16:1076 (1999)]. For secure communications A. W. Weiner et al. [see IEEE J. Quantum Electron 28:2251 (1992)] proposed a technique based on spectral phase coding for encryption and decryption of femtosecond pulses. This technique can be used in a code-division multiple-access network. Pulse shapers (or spatial-temporal converters) can be used to send spatial data to remote users at ultrahigh speeds as great as terabit(s).

It is among the objects of the present invention to provide an ultrafast data communication system that can link remote users to an encrypted database with high security and ultrafast transfer rate.

SUMMARY OF THE INVENTION

In accordance with a form of the invention, an ultrafast secure data communication system and method is set forth that can link remote users to an encrypted database with high security and ultrafast transfer rate. A data storage method and system is also set forth.

In an embodiment of the present invention, all data are stored holographically in a storage medium such as conventionally used photorefractive materials or photopolymers after the original data is encrypted in the spatial domain with double-random phase encryption [see Opt. Lett. 20:767 (1995)]. Each encrypted spatial datum can be sent to the receivers at ultrahigh speed with spatial-temporal converters. At each receiver the temporal data are converted back into spatial data, and the original data can be reconstructed when tested by use of a correct random phase key. If one should use an incorrect key, the reconstructed data will remain as a random-noise like image, owing to the nature of double-random phase encryption. An embodiment of the invention uses double-random phase encryption and is more secure than the spectral phase coding system in which only one random phase mask was used in the Fourier plane, because a phase-retrieval algorithm cannot be used to reconstruct the data.

An embodiment of the present invention is directed to an ultrafast secure data communications system and method that uses spatial-temporal converters. In this system and method, the original spatial signal is optically encrypted, and the encrypted signal is holographically stored in a storage medium such as a photoreactive material. The spatially encrypted signal is sampled to avoid the overlap of each datum at the receiver. The sampled data are converted into a temporal signal in order to transmit the information through an optical fiber. At the receiver-end, the temporal signal is converted back into the initial spatially encrypted signal. Retrieval of the original data can then be achieved when the correct phase key is used in a decryption system. A feature hereof is the development of an expression of encrypted output and decrypted data.

In studies by Marcom et al. [see Appl. Opt. 37:2858 (1998)], it was pointed out that the spatial data sent by spatial-temporal converters broadens because the point-spread function of the system is dependent on the input pulse width. Thus, they concluded, encrypted data at the transmitter should be sampled to avoid the overlap between adjacent pixels at the receiver-end that are due to the point-spread function caused by the pulse width of input light. In view of these prior reports, and as described further hereinbelow, the system described herein was analyzed to provide a numerical evaluation of the effect of sampling of the spatially encrypted data on the quality of the reconstructed data.

In accordance with an embodiment of the technique of the invention, a method is set forth for securely communicating information, comprising the following steps: optically encrypting said information and storing the resulting encrypted data; reading out the encrypted data in the spatial domain, and converting said encrypted data to the temporal domain; transmitting the converted encrypted data; receiving the transmitted encrypted data and converting the received encrypted data to the spatial domain; and decrypting the converted received encrypted data to recover said information. In a preferred form of the invention, the step of reading out the encrypted data in the spatial domain and converting the encrypted data to the temporal domain is implemented using ultrafast laser pulses.

Further features and advantages of the invention will become more readily apparent from the following detailed description when taken in conjunction with the accompanying drawings.

DETAILED DESCRIPTION

Figure 1:
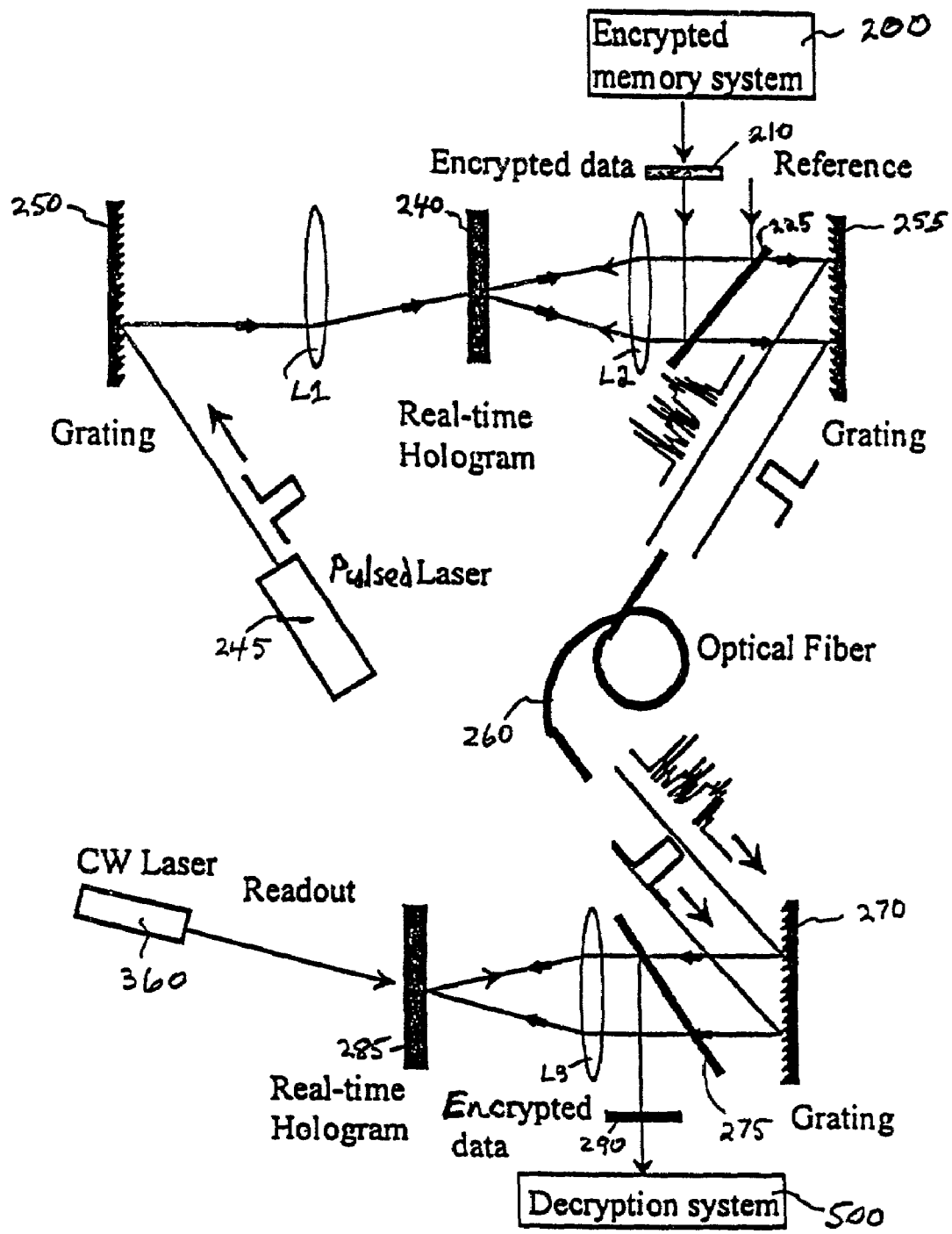
FIG. 1 illustrates the encryption optical memory system, both at the transmitted-end and receiver-end, according to an embodiment of the present invention using spatial-temporal converters and double-random phase encoding.

An illustration of the proposed ultrafast secure data communication system and method according to an embodiment of the invention is shown in FIG. 1. The proposed system comprises four subsystems, which are (1) an optically encrypted memory system, (2) a transmitter to convert the encrypted data into temporal data with a space-to-time converter, (3) a receiver to convert the temporal data into the encrypted data with a time-to-space converter, and (4) an optical decryption system. Each individual subsystem is more fully described below.

In the embodiment of FIG. 1, an encrypted memory system 200 (for example, the system of FIG. 2) receives input information (for example, images or text) and stores encrypted data in optical storage medium 210, for example holographic optical storage. The data read out of optical storage 210 and a reference beam from a laser (not shown) are input to interferometric optical processing, represented as including splitter 225 and lens L2, to obtain real time hologram at a storage medium 240, such as a multiple quantum well photorefractive device or higher order material. A pulsed laser 245 produces ultrafast input pulses (preferably in the femtosecond range or faster) directed at grating 250 which, by diffraction, spreads the pulse in the spatial domain according to its spectral components. (It will be understood that other suitable diffractive means can be utilized herein where gratings are described.) Briefly, the real-time hologram at 240 is read, a line at a time in this embodiment, and, after Fourier transformation by lens L1, converted to the spectral domain by grating 255. The optical field behind the hologram is inverse Fourier transformed by lens L2 and diffracted by grating 255 to obtain the desired temporal signal and pulse which are, as shown, coupled into fiber optical transmission line 260.

At the receiver, the temporal signals are converted back to the spectral domain using grating 270, and used to form a real-time hologram at medium 285 via splitter 275 and transformation lens L3. In this embodiment, CW laser 360 is used to read out the real-time hologram, which is Fourier transdformed by lens L3 and directed by splitter 275, such that encrypted data (290) can be decrypted by decryption system 500.

Figure 2:
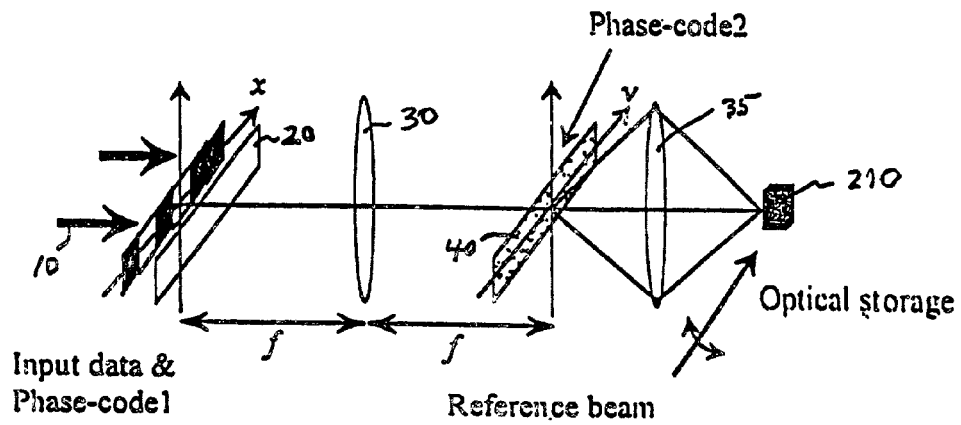
FIG. 2 depicts an encrypted memory system comprising the recording (a) and readout (b) components according to an embodiment of the present invention.
Figure 2:
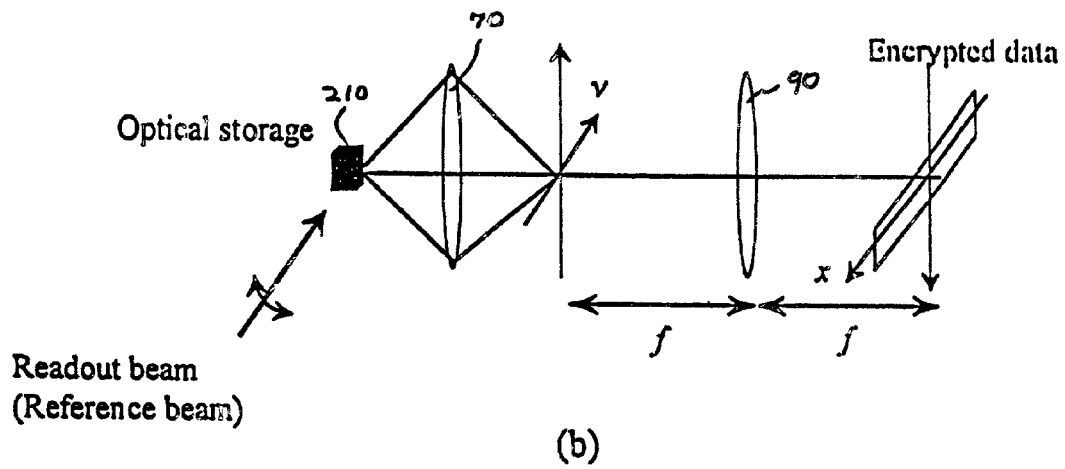

The optically encrypted memory subsystem (200, 210) according to an embodiment of the invention is shown in FIG. 2. As used, the original data are encrypted by the use of two random phase codes in the input and the Fourier planes. Because of the nature of one-dimensional temporal signals, it has been found convenient to use a one-dimensional spatial signal. Mathematically this may be exemplified by letting $g_i(x)$ denote the ith frame of positive real-valued data to be encrypted. Let $n_i(x)$ and $h_i(v)$ denote two independent white sequences that are uniformly distributed on the interval [0,2, π]. Here x denotes the spatial-domain coordinate and v denotes the Fourier-domain coordinate. The FIG. 2(a) reference numerals 20 and 40 represent coded phase plates operating respectively in the spatial and frequency domains, and lenses 30 and 35 represent, respectively, conversion to the Fourier domain and then the inverse, that is, back to the spatial domain. In the encryption process the input data are illuminated by a collimated light beam and these are then multiplied by a random phase function $\exp\{-jn_i(x)\}$. The Fourier transform of the input data is multiplied by another random phase function, $H_i(v)=\exp\{-jh_i(v)\}$ and is written by $$E_i(v)=G_i(v)H_i(v) \quad \text{(Equation 1)}$$

wherein $$G_i(v)=F[g_i(x)\exp\{-jn_i(x)\}] \quad \text{(Equation 2)}$$

In the above equation 2, $F\{\bullet\}$ denotes the operation of Fourier transform. These Fourier-transformed encrypted data are stored holographically, together with a reference beam, in a volume storage material (which are well-known) such as a photorefractive material. In order to provide for the storage of many frames of data, angular multiplexing or some other alternative may be employed. The total intensity distribution, φ(v), is given by $$\phi(v) = \sum_{i}^{M} |E_i(v) + R_i(v)|^2 \quad \text{(Equation 3)}$$

Wherein M is the total number of stored frames and $R_i(v)$ is a reference beam with a specific angle used to record the ith encrypted data. In the photorefractive material the refractive-index distribution is modulated according to this intensity distribution to store as volume holograms [see, for example, the discussion in *The Physics and Applications of Photoretractive Material,* Oxford, Clarendon Press, 1996]. In accordance with the presently described system, the erasure of holograms due to the multiple recording is neglected. An appropriate angular separation between adjacent stored data will suppress the cross talk in the reconstructed data, because the stored frames of data create volume holograms.

In the readout process, (FIG. 2(b)), a readout beam is the reference beam. In FIG. 2(b), the lenses 70 and 90 perform the inverses of the lens functions in FIG. 2(a). The ith reconstructed frame of the stored data is given by $$r_i(x)=[g_i(x)\exp\{-jn_i(x)\}]\otimes F[\exp\{-jh_i(v)\}] \quad \text{(Equation 4)}$$

wherein ⊗ denotes convolution. This encrypted signal is converted into a temporal encrypted signal by use of the space-to-time converter, as described below, before being transmitted through an optical fiber.

Figure 3:
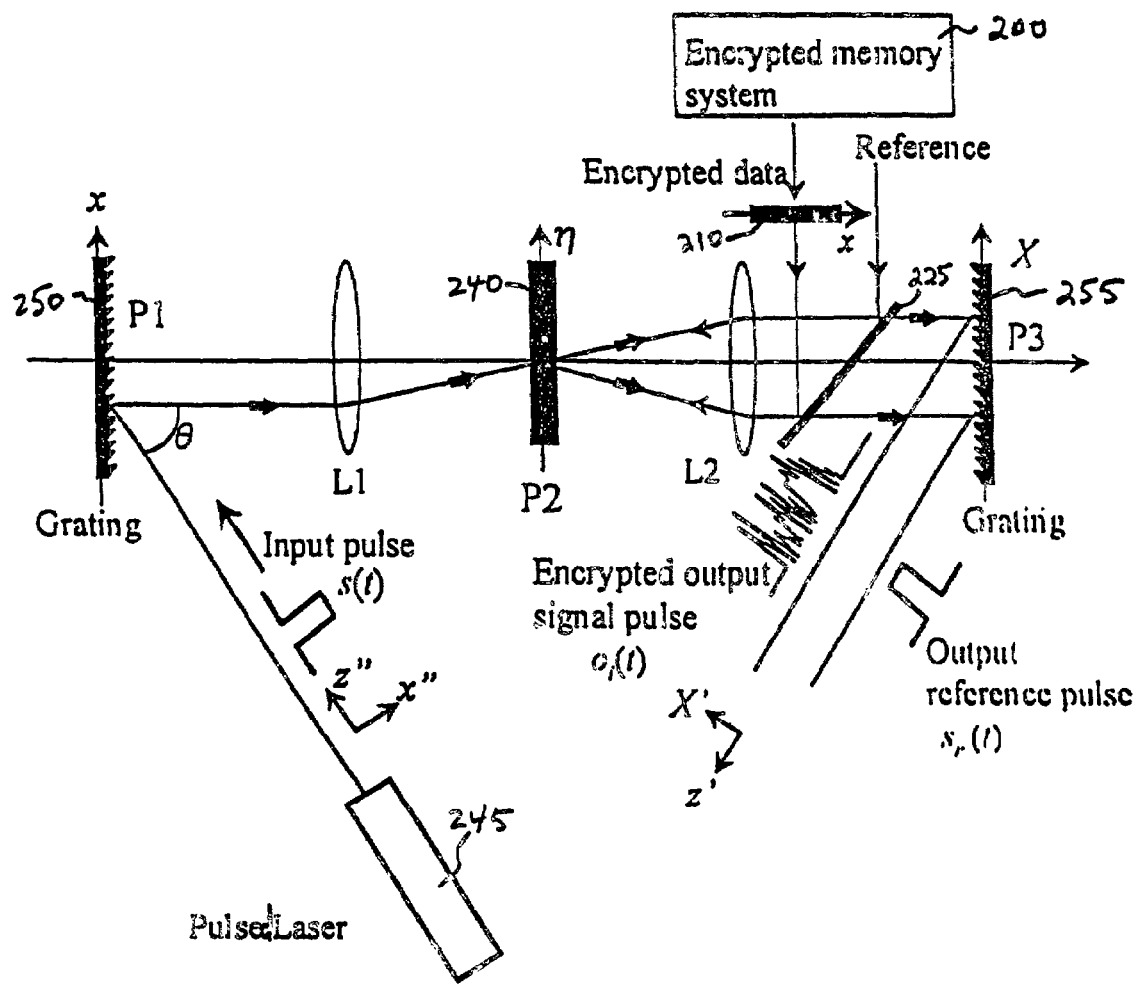
FIG. 3 depicts an encryption transformer using a space-to-time converter in accordance with an embodiment of the present invention.

An optical transmitter based on the space-to-time converter as shown in FIG. 3 (the transmitter portion of FIG. 1) has been previously analyzed by Sun et al. Appl. Optics, 37, 2858 (1998). Using their analysis, an output temporal signal carrying the encrypted data can be derived. In the present invention, a complex value notation was introduced here simply because optical encryption generates complex data. A spatially collimated and temporally transformed limited optical pulse can be written as $$s(t)=p(t-t_0)\exp(j\omega_0 t) \quad \text{(Equation 5)}$$

wherein p(t) is the envelope of the pulse, $t_o$ is the time of the peak intensity, and $\omega_0$ is the central temporal angular frequency of the pulse. The temporal angular frequency distribution is calculated by taking the temporal Fourier transform of Equation 5:

$$S(\omega)=P(\omega-\omega_0)\exp\{-j(\omega-\omega_0)t_o\} \quad \text{(Equation 6)}$$

wherein P(ω)) is the temporal Fourier-transformed p(t).

If the angular frequency response of the space-to-time converter described in FIG. 3 is considered, it can be conceived that a grating is arranged to diffract the light pulse with central angular frequency of $\omega_0^\sim$ into the direction of the optical axis. When a monochromatic plane wave with an angular frequency of $\omega$ is incident at an angle of $\omega$ against the grating, the diffracted optical field at the plane P1 will be given by $$\psi_1(x;\omega) = \exp\left\{-j\frac{\omega-\omega_0}{c}\alpha x\right\}w(x) \quad \text{(Equation 7)}$$

wherein $\alpha = \sin\theta$, $w(x)$ is a pupil function of the grating, and $c$ is the speed of light in a vacuum. In this instance, the optical field at P2 can be obtained after taking the spatial Fourier transform of Equation 7 by lens L1, and is written by:

$$\psi_2(\eta;\omega) = W\left\{\frac{\omega\eta}{2\pi c f} + \frac{\omega-\omega_0}{2\pi c}\alpha\right\}, \quad \text{(Equation 8)}$$

wherein $W(\eta)$ is the spatial Fourier transform of $w(x)$, $\eta$ is the Cartesian coordinate in the plane P2, and $f$ is the focal length of lens L1. Equation 8 shows that the Fourier spectra in the Fourier plan is a function of the angular frequency of light. When the pupil function $w(x)$ is infinite, i.e., $W(\eta)=\delta(\eta)$, the relation between $\eta$ and $(\omega-\omega_0)$ and is given by $$\eta = -f\alpha\frac{\omega-\omega_0}{\omega}. \quad \text{(Equation 9)}$$

The spatially spread spectra are modulated by a hologram recorded by the Fourier transform of the encrypted signal described in Equation 4 and a reference beam.

The hereof description assumes that the encrypted signal $r_i(x)$, described in Equation 4, was sampled at an interval of $\Delta$ in the input plane. This data sampling was required to avoid any overlap between adjacent data in the reconstructed spatial data at the receiver because of the point-spread function of spatial-temporal converters [as described in Appl. Opt. 37:2858 (1998)]. As mathematically described below, the spatial data after the transmission of spatial-temporal converters become broad at the receiver. The sampled encrypted signal is given by $$r_i'(x) = \sum_n r_i(x)\delta(x-n\Delta) \quad \text{(Equation 10)}$$
$$= \sum_n A_i(x)\exp\{j\phi_i(x)\}\delta(x-n\Delta)$$
$$= \sum_n A_i(n\Delta)\exp\{j\phi_i(n\Delta)\}\delta(x-n\Delta)$$

wherein $A_i(x)=|r_i(x)|$ and $\exp\{j\phi_i(x)\}=r_i(x)/|r_i(x)|$. A spatial Fourier transform of the encrypted input signal by lens L2 is given by $$R_i(\eta) = \sum_n A_i(n\Delta)\exp\{j\phi_i(n\Delta)\}\exp\left(-j\frac{n\Delta\omega'}{cf}\eta\right) \quad \text{(Equation 11)}$$

wherein $\omega'=2\pi c/\lambda'$, f is the focal length of lens L2, and $\lambda'$ is the wavelength of the light beam used to write the resulting hologram. This signal was recorded as the real-time hologram in a storage medium, such as a multiple-quantum-well photorefractive device or higher-order nonlinear material. A hologram was created by the encrypted data described in Equation 11 and a reference beam. Assuming that the hologram works as a grating with the transmittance of $$t_i(\eta) = \sum_n A_i(n\Delta)\exp\{j\phi_i(n\Delta)\}\exp\left(-j\frac{n\Delta\omega'}{cf}\eta\right) \quad \text{(Equation 12)}$$

In which the effect of the carrier frequency of the hologram caused by the angle of the encrypted data and the reference beam was neglected.

The temporal signal in Equation 8 is modulated by the hologram described in Equation 12. The optical field behind the hologram is expressed by $$\psi_3(\eta;\omega) = \psi_2(\eta;\omega)t_i(\eta) \quad \text{(Equation 13)}$$
$$= W\left\{\frac{\omega\eta}{2\pi c f} + \frac{\omega-\omega_0}{2\pi c}\alpha\right\} \times$$
$$\sum_n A_i(n\Delta)\exp\{j\phi_i(n\Delta)\}\exp\left(-j\frac{n\Delta\omega'}{cf}\eta\right)$$

This modulated field was then Fourier transformed by lens L2, and this provides for the following equation:

$$\psi_4(X;\omega) = \sum_n A_i(n\Delta)\exp\{j\phi_i(n\Delta)\}\exp \quad \text{(Equation 14)}$$
$$\left\{j\frac{\omega-\omega_0}{c}\alpha\left(X+n\Delta\frac{\omega'}{\omega}\right)\right\}w\left(-X-n\Delta\frac{\omega'}{\omega}\right)$$

This optical field was diffracted again by a grating and is given by $$\psi_5(X';\omega) = \sum_n A_i(n\Delta)\exp\{j\phi_i(n\Delta)\} \quad \text{(Equation 15)}$$
$$\exp\left\{j\frac{\alpha n\Delta}{c}\frac{(\omega-\omega_0)\omega'}{\omega}\right\}w'\left(-X'-n\Delta\frac{\omega'}{\omega}\right)$$

wherein X' is the coordinate as shown in FIG. 3 and w'(X') is the pupil function of the grating projected onto the X' coordinate. The output temporal signal may be obtained by taking an inverse temporal Fourier transform of $\psi_5(X', \omega)S(\omega)$ that is written by $$o_i(X', t) = \int_{-\infty}^{\infty} \psi_5(X'; \omega)S(\omega)\exp(-j\omega t)d\omega \quad \text{(Equation 16)}$$

$$= \sum_n A_i(n\Delta)\exp\{j\phi_i(n\Delta)\}w'\left(-X' - n\Delta\frac{\omega'}{\omega_0}\right)$$

$$p(t - t_0 + n\delta t)\exp(j\omega_0 t)$$

wherein $\delta t = (\alpha\Delta/c) \times (\omega'/\omega_0)$. To do this, the following approximation was used:

$$\frac{1}{\omega} = \frac{1}{\omega_0 + \Delta\omega} = \frac{1}{\omega_0}\left(\frac{1}{1 + \Delta\omega/\omega_0}\right) \approx \frac{1}{\omega_0}\left(1 - \frac{\Delta\omega}{\omega_0}\right) \approx \frac{1}{\omega_0} \quad \text{(Equation 17)}$$

to derive Equation 16 because $\Delta\omega = (\omega - \omega_0) << \omega_0^2$ in a few hundreds femtosecond pulse and the center angular frequency of $6\pi \times 10^{14}$.

A light pulse, which is passing through the storage medium without diffraction, because of the hologram, has the same envelope as the input pulse; and thus it can be written as $$s_r(t) = p(t - t_0)\exp(j\omega_0 t) \quad \text{(Equation 18)}$$

This pulse may be used as a reference pulse. The temporally encrypted signal described in Equation 16 and the reference pulse in Equation 18 were sent to the receiver through a single-mode fiber to eliminate any distortion that was due to the fiber at the receiver. Both pulses were preferably separated by a delay line before the fiber.

Figure 4:
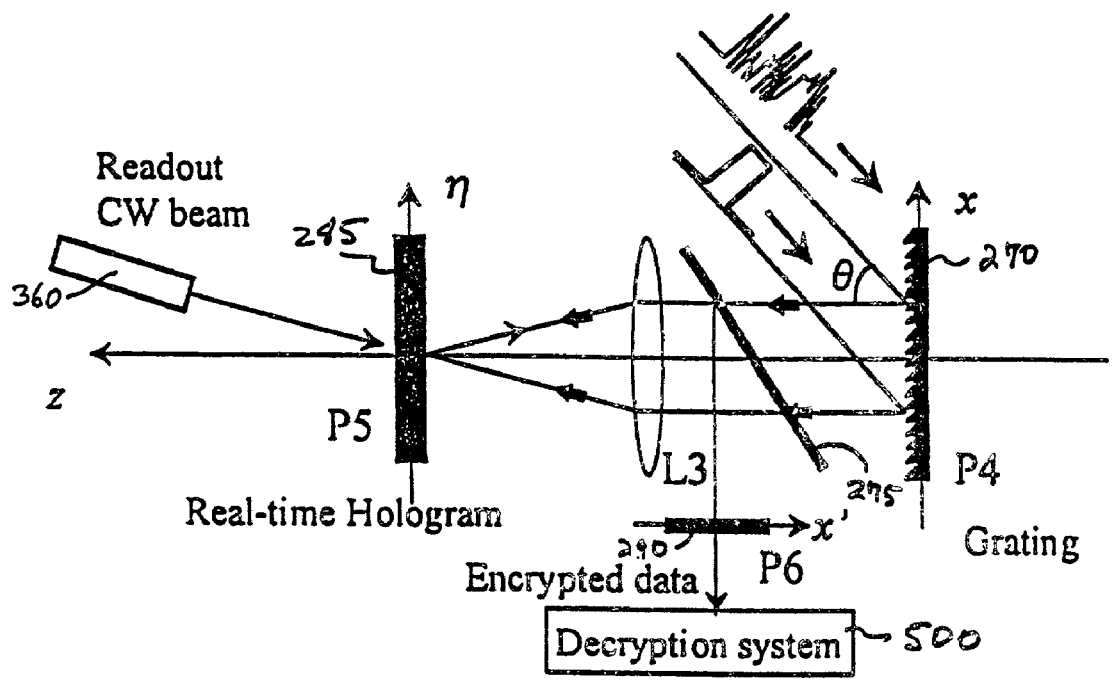
FIG. 4 depicts a receiver using a time-to space converter in accordance with an embodiment of the invention.

At the receiver the temporally encrypted data were converted into spatially encrypted data by use of a time-to-space converter. Because a single-mode fiber is used to send the temporally encrypted pulse and the reference pulse, the spatial information of both pulses should be dropped. As shown in FIG. 4, the two light pulses are diffracted by a grating and then form a hologram after being spatially Fourier transformed by Lens L3.

In considering the temporal angular frequency domain with Equations 3, 16, and 18, the intensity distribution of the interference pattern at the Fourier plane P5 is described by $$I_i(\eta, \omega) = \left| O_i(\omega)W\left[\frac{\omega\eta}{2\pi cf} + \frac{\omega - \omega_0}{2\pi c}\alpha\right] + S_r(\omega)W\left[\frac{\omega\eta}{2\pi cf} + \frac{\omega - \omega_0}{2\pi c}\alpha\right]\right|^2 = |O_i(\omega)|^2 \times$$

$$\left|W\left[\frac{\omega\eta}{2\pi cf} + \frac{\omega - \omega_0}{2\pi c}\alpha\right]\right|^2 + |S_r(\omega)|^2 \times$$

$$\left|W\left[\frac{\omega\eta}{2\pi cf} + \frac{\omega - \omega_0}{2\pi c}\alpha\right]\right|^2 + O_i^*(\omega)S_r(\omega)$$

$$\left|W\left[\frac{\omega\eta}{2\pi cf} + \frac{\omega - \omega_0}{2\pi c}\alpha\right]\right|^2 +$$

$$O_i(\omega)S_r^*(\omega)\left|W\left[\frac{\omega\eta}{2\pi cf} + \frac{\omega - \omega_0}{2\pi c}\alpha\right]\right|^2$$

wherein $W(\eta)$ is the spatial Fourier transform of $w(x)$, $w(x)$ is a pupil function of the grating, $$O_i(\omega) = \sum_n A_i(n\Delta)\exp\{j\phi_i(n\Delta)\} \quad \text{(Equation 20)}$$

$$P(\omega - \omega_0)\exp\{-j(\omega - \omega_0)(t_0 - n\delta t)\}$$

and $$S_r(\omega) = P(\omega - \omega_0)\exp\{-j(\omega - \omega_0)t_0\}. \quad \text{(Equation 21)}$$

In this instance, the time separation between the reference pulse and the nth data pulse is $n\delta t$. For purposes hereof, it is assumed that the thin hologram was created by the interference pattern between the reference pulse and the encrypted data pulse, provided that the optical power of the reference pulse is much larger than that of each data pulse. The third term of Equation 19 is used to reconstruct the spatially encrypted signal. A cw laser beam is incident at the hologram to read out the stored data. The reconstructed optical field was then spatially Fourier transformed by lens L3. When the pupil function of the grating and a beam width are large, i.e., $W(\eta) = \delta(\eta)$, the reconstructed signal at plane P6 is expressed by $$\xi_i(x') = F\left[\sum_n A_i(n\Delta)\exp\{-j\phi_i(n\Delta)\} | P(\omega - \omega_0) |^2 \right. \quad \text{(Equation 22)}$$

$$\left. \exp\{-j(\omega - \omega_0)n\delta t\}\right]$$

With Equations 9 and 17, Equation 22 is calculated as follows:

(Equation 19)

$$\xi_i(x') = \int_{-\infty}^{\infty} \sum_n A_i(n\Delta) \exp\{-j\phi_i(n\Delta)\} \mid P(-\omega_0 \eta / f\alpha) \mid^2$$ (Equation 23)

$$\exp\{j\omega_0 \eta n\delta t / f\alpha\} \exp\{-j2\pi x' \eta / \lambda'' f\} d\eta$$

$$= \sum_n A_i(n\Delta) \exp\{-j\phi_i(n\Delta)\} \exp\left\{-\frac{\alpha^2 \left(\frac{1}{\lambda''}x' + n\frac{\Delta}{\lambda'}\right)^2}{4\omega_0^2 \tau^2}\right\}$$

wherein the Gaussian-shaped input pulse envelope written by $p(t)=\exp(-t^2/2\tau^2)$ is used and wherein $\tau$ is a pulse width, and $\lambda''$ is the wavelength of the cw laser beam. Equation 23 shows that each pixel is spread by a Gaussian function with a $1/e^2$ width of $w_d=4\sqrt{2}\omega_0 \tau \lambda''/\alpha$. This signal was used in the following decryption system (see FIG. 5).

When the $1/e^2$ width of the Gaussian function, $w_d$ is smaller that the sampling interval, $\Delta$, the reconstructed data do not overlap one another. After Equation 21 is sampled at $x=n\Delta$, modified reconstructed data are given by $$\xi'_i(x) = \xi_i(x)\delta(x - n\Delta) = \sum_n A_i(n\Delta)\exp\{-j\phi_i(n\Delta)\}$$ (Equation 24)

This equation shows that the complex conjugation of the encrypted signal in Equation 10 is reconstructed. To decrypt the data, the spatial Fourier transform of Equation 24 is multiplied by the phase key $H^i(v)=\exp\{-jh_i(v)\}$. This phase key was the same random phase mask as that used in the encryption system. In the Fourier plane the reconstructed data are written by $$\Psi_i(v) = \left\{G_i^*(v)H_i^*(v) \otimes \exp\left(j\frac{2\pi}{\lambda f}n\Delta v\right)\right\}H_i(v)$$ (Equation 25)

wherein v denotes the coordinate in the Fourier plane P7 $\otimes$ denotes convolution, and $G_i(v)$ is defined in Equation 2. Finally, the reconstructed data was obtained by taking another Fourier transform by lens L4:

$$I_{out}(x) = \sum_n g_i(x)\exp(-jn_i(x)) \otimes$$ (Equation 26)

$$F * [\exp(-jh_i(v))] \cdot \delta(x - n\Delta) \otimes F[\exp(-jh_i(v))]$$

As discussed below, the error in the decrypted data that is due to the sampling effect may be numerically evaluated.

When $\omega_0=6\pi\times10^{14}$, $\lambda''=1$ μm, $\alpha=1/\sqrt{2}$, and $\tau=50$ fs, $w_d$ is 754 μm. If the sampling interval, $\Delta$, is smaller than the width of Gaussian distribution, $w_d$, in Equation 23, the reconstructed spatial data overlap one another. Thus, the original data cannot be reconstructed when the overlap is large, even if the correct phase key in the decryption process is used.

Figure 6:
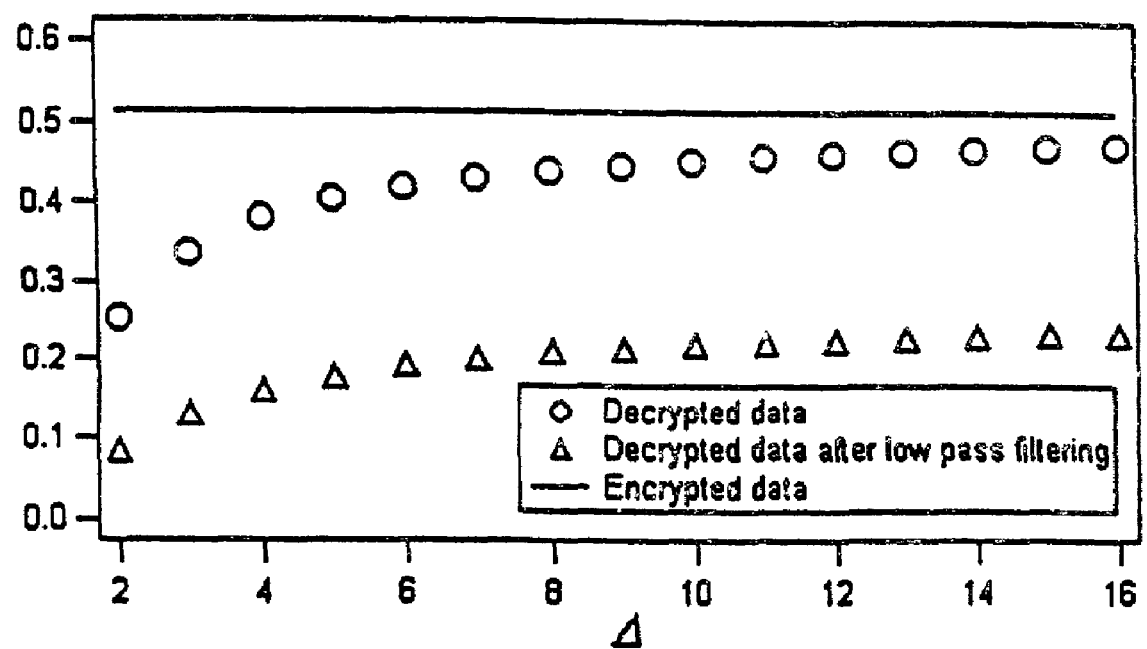
FIG. 6 is a graphic representation of the mean-square errors between original and reconstructed data with low-pass filtration as a function of the sampling interval Δ.
Figure 7:
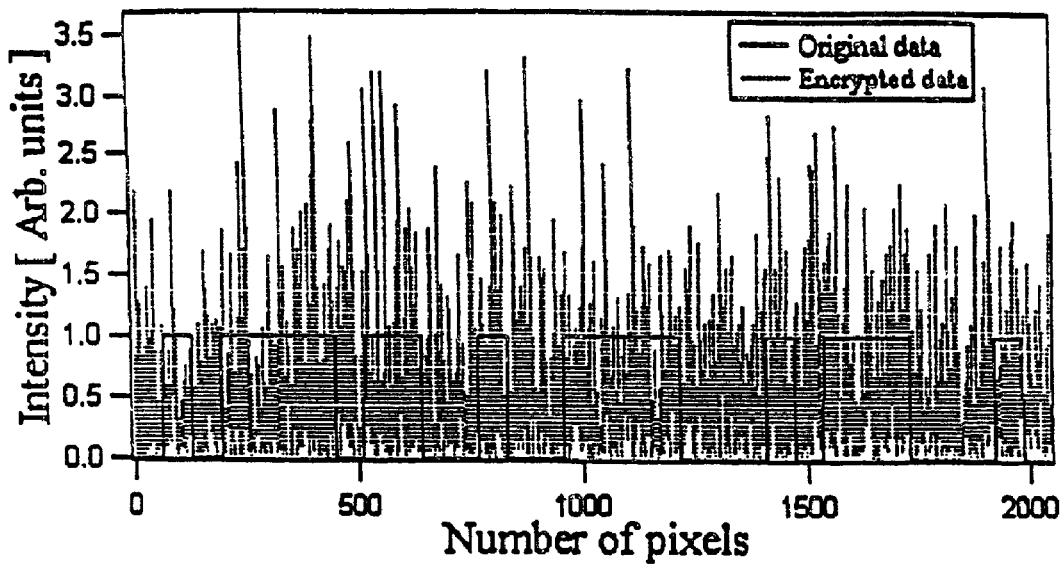
FIG. 7 depicts examples of original digital data, encrypted data and reconstructed data in which (a) depicts the original digital data and the encrypted data and (b) depicts the original digital data and the reconstructed data (low-pass filtered) when the sampling interval, Δ, is 2.
Figure 7:
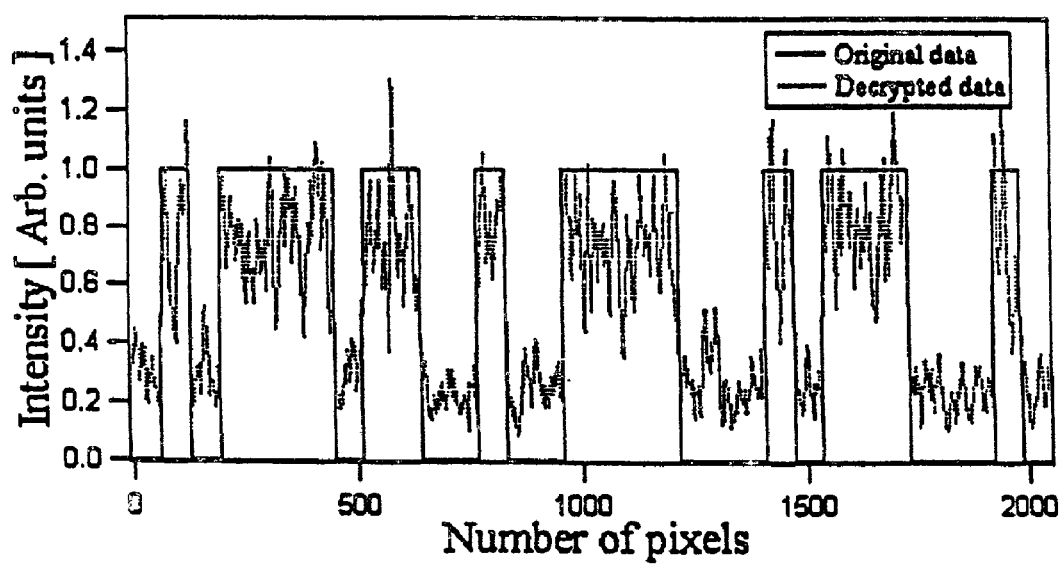

From J. Opt. Soc. Am. A [15:2629 (1998)] it was pointed out that the double-phase encryption is robust to the occlusion of encrypted data; however, the encryption affects the quality of the recovered data. Therefore undersampling the encrypted data may cause similar errors in the decrypted data in the system according to the present invention. Thus, the error between the original data and the reconstructed data was numerically evaluated using the sampled encrypted data based on Equation 26. When the encrypted data was undersampled by a factor of 2×, half the encrypted data was lost. By use of binary data it was possible to reduce the noise in the decrypted data by thresholding. A mean-squared error was used as the performance criterion, $$e=E\{g(x)-m\times g_\Delta(x)\}^2$$ (Equation 27)

where $E\{\bullet\}$ denotes statistical average, $g(x)$ is the original data, m denotes the coefficient to compensate for the loss of total power due to undersampling the encrypted data, and $g\Delta'(x)$ are the reconstructed data when the encrypted data are sampled at the interval of $\Delta$. The original digital data used in the tests are 32-bit data where each bit consists of 64 pixels. Thus, the input data have 2048 pixels. This redundancy of the original data was introduced to recover the original binary data by thresholding of the reconstructed (decrypted) data when there was loss of encrypted data due to sampling. Two random phase codes in the input and the Fourier planes consist of 2048 pixels. The original digital data and the two random phase codes were randomly generated by a computer, and the average mean-squared error was calculated over 1000 different trials. FIG. 6 shows the mean-squared error, e, as a function of the sampling interval, $\Delta$. The error increased as the sampling interval increased. This finding was due to the loss of the encrypted data as $\Delta$ increases. When $\Delta=1$, the original data could be reconstructed without error. FIG. 6 also shows that low-pass filtering of the decrypted data decreased the mean-squared error. The low-pass filtering was performed by local averaging of the data with a 1×11 pixel window. An example of original data, encrypted data, and decrypted data is shown in FIG. 7. Here the decrypted data are low-pass filtered. It can be seen that the encrypted data are randomly encoded, but the decrypted data have the same structure as the original data. Thus, tests indicated that the space-bandwidth product of the original binary data determined whether it was possible to recover the original binary data without error when some of the encrypted data were under-sampled.

Figure 8:
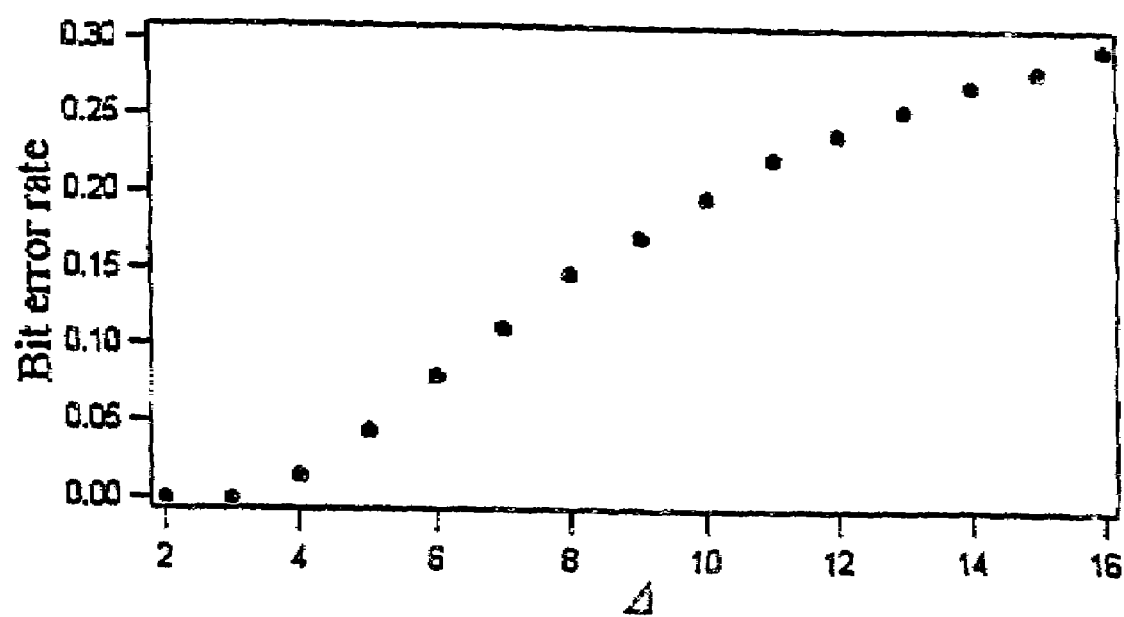
FIG. 8 graphically depicts the bit error rate of binarized reconstructed data as a function of the sampling interval, Δ.

The bit error rate as a function of the sampling interval, $\Delta$ was also calculated. By using the reconstructed analog data, the energy of each cell of the reconstructed image was calculated. There are a number of methods to threshold the reconstructed output data. To determine the threshold value, all energies were rank ordered. The threshold value was the Nth largest energy of the cells, where N is the number of bright pixels (1's) in the original binary data. This preserved the number of bright pixels between the decrypted data and the original data. FIG. 8 shows the bit error rate as a function of $\Delta$. For the binary data described herein, the original digital data were reconstructed without error by application of the computed threshold in the case of $\Delta=1$ and 2.

As described herein, the present invention provides for an ultrafast data communication system, using spatial-temporal converters; the proposed system has been analyzed and a numerical evaluation of the effect of sampling of the spatially encrypted data on the quality of reconstructed data has been shown. When the encrypted data were undersampled, the loss of the encrypted data resulted in error in the decryption of data. It is also shown that it was possible to recover the original binary data by thresholding when the pulse width was smaller than the sampling interval of encrypted data and the sampling interval was short. When the incorrect phase mask was used in the decryption process, the original data was not able to be reconstructed. The system according to the present invention has the potential to implement data transmission with high security and an ultrafast transfer rate.

Accordingly, optical temporal-to-spatial and spatial-to-temporal converters using ultrashort pulses have been investigated because of extremely high converting speed at Tbit/s. As the temporal signal can be sent through an optical fiber, there are possible applications to high speed optical information processing or database systems based on these converters.

Figure 5:
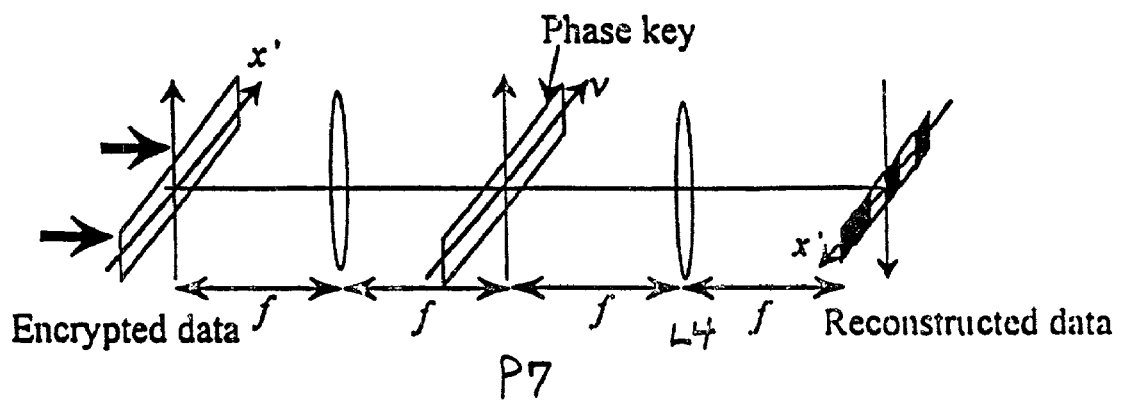
FIG. 5 depicts the decryption system according to an embodiment of the invention utilizing a phase key for decryption.

In summary, in the present invention, an ultrafast secure data secure data transmission using time-to-space converters has been described. The spatial original data is encrypted by using double random phase encoding and is then stored in an optical storage material as shown in FIG. 2. (Multi-dimensional keys can be used to make the system more secure.) The spatial data readout from the storage material is converted into a temporal signal by using a space-to-time converter. (FIGS. 1 and 3). This temporal encrypted data is transmitted through an optical fiber. In the receiver the temporal encrypted signal is converted into a spatial signal and is then decrypted. In the decryption it is necessary to use the correct phase key in the Fourier plane for successful retrieval of the original data (FIGS. 1, 4, and 5). The correct key is the same as the random phase mask used in the Fourier plane in the encoding process.

The encryption and decryption in the proposed system was evaluated by numerical technique. The size of pixel of encrypted data in the receiver is expanded in proportion to the width of the optical pulse due to the space-to-time and time-to-space converters. Thus the need to sample the encrypted data to avoid overlapping between adjacent pixels in the receiver. That the original digital data was recovered even when the encrypted data was undersampled was confirmed.

The invention claimed is:

1. A method for securely communicating information, comprising:
   optically encrypting said information and storing the resulting encrypted data;
   reading out the encrypted data in a spatial domain;
   sampling the encrypted data in the spatial domain to avoid overlap in the spatial domain between adjacent data at a receiving end;
   converting said encrypted data to a temporal domain;
   transmitting the converted encrypted data;
   receiving the transmitted encrypted data and converting the received encrypted data to the spatial domain;
   sampling the received encrypted data in the spatial domain after the data has been received and converted to the spatial domain; and
   decrypting the converted received encrypted data to reconstruct said information.

2. The method as defined by claim 1, wherein said reading out the encrypted data in the spatial domain and converting the encrypted data to the temporal domain are implemented using ultrafast laser pulses.

3. The method as defined by claim 1, wherein said reading out the encrypted data in the spatial domain and converting the encrypted data to the temporal domain are implemented using ultrafast laser pulses spread in the spatial domain according to their spectral components.

4. The method as defined by claim 3, wherein said ultrafast pulses are spread in the spatial domain by diffraction.

5. The method as defined by claim 1, wherein said transmitting the converted data comprises transmitting said converted data over an optical network.

6. The method as defined by claim 1, wherein said converting received encrypted data to the spatial domain is implemented using ultrafast laser pulses.

7. The method as defined by claim 1, wherein said optical encryption includes random phase encryption.

8. The method as defined by claim 2, wherein said optical encryption includes double random phase encryption.

9. The method as defined by claim 8, wherein said double random phase encryption includes phase encryption in the spatial domain and phase encryption in the frequency domain.

10. The method as defined by claim 1, wherein said storing of encrypted data comprises holographically storing said encrypted data.

11. The method as defined by claim 1, wherein said reading out and converting said encrypted data comprises:
    forming a real-time hologram using read-out encrypted data and a reference beam;
    reading out the real-time hologram; and
    converting the read-out hologram from the spatial domain to the temporal domain.

12. The method as defined by claim 11, wherein said reading out the real-time hologram comprises directing a diffracted ultrafast laser pulse at said real time hologram.

13. The method as defined by claim 5, wherein said reading out and converting said encrypted data comprises:
    forming a real-time hologram using read-out encrypted data and a reference beam;
    reading out the real-time hologram; and
    converting the read-out hologram from the spatial domain to the temporal domain.

14. The method as defined by claim 13, wherein said reading out the real-time hologram comprises directing a diffracted ultrafast laser pulse at said real time hologram.

15. The method as defined by claim 1, wherein said decrypting the converted received encrypted data includes phase decoding of said converted received encrypted data.

16. The method as defined by claim 1, wherein said decrypting the converted received encrypted data includes phase decoding of said converted received encrypted data in the spatial domain and in the frequency domain.

17. A method for securely communicating information, wherein the information is stored encrypted data, the method comprising:
    reading out the encrypted data in a spatial domain;
    sampling the encrypted data in the spatial domain to avoid overlap in the spatial domain between adjacent data at a receiving end;
    converting said encrypted data to a temporal domain;
    transmitting the converted encrypted data;
    receiving the transmitted encrypted data and converting the received encrypted data to the spatial domain;
    sampling the received encrypted data in the spatial domain after the data has been received and converted to the spatial domain; and
    decrypting the converted received encrypted data to reconstruct said information.

18. The method as defined by claim 17, wherein said reading out the encrypted data in the spatial domain and converting the encrypted data to the temporal domain is implemented using ultrafast laser pulses.

19. The method as defined by claim 17, wherein said reading out the encrypted data in the spatial domain and converting the encrypted data to the temporal domain is implemented using ultrafast laser pulses spread in the spatial domain according to its spectral components.

20. The method as defined by claim 17, wherein said stored encrypted data comprises holographically stored encrypted data, and wherein said reading out and converting said encrypted data include:

forming a real-time hologram using read-out encrypted data and a reference beam;

reading out the real-time hologram; and converting the read-out hologram from the spatial domain to the temporal domain.

21. The method as defined by claim 20, wherein said reading out the real-time hologram comprises directing a diffracted ultrafast laser pulse at said real time hologram.

* * * * *